(12) United States Patent
Stringham

(10) Patent No.: US 7,634,657 B1
(45) Date of Patent: Dec. 15, 2009

(54) REDUCING THE PROBABILITY OF UNDETECTED COLLISIONS IN HASH-BASED DATA BLOCK PROCESSING

(75) Inventor: Russell R. Stringham, Orem, UT (US)

(73) Assignee: Symantec Corporation, Mountain View, CA (US)

(*) Notice: Subject to any disclaimer, the term of this patent is extended or adjusted under 35 U.S.C. 154(b) by 945 days.

(21) Appl. No.: 11/021,518

(22) Filed: Dec. 23, 2004

(51) Int. Cl.
*H04L 9/32* (2006.01)
*H04K 1/00* (2006.01)
*H04K 1/02* (2006.01)

(52) U.S. Cl. .................. 713/168; 380/251; 380/259

(58) Field of Classification Search .......... 713/168; 380/251, 259
See application file for complete search history.

(56) References Cited

U.S. PATENT DOCUMENTS

| | | | | |
|---|---|---|---|---|
| 4,933,969 A | * | 6/1990 | Marshall et al. | 713/177 |
| 6,470,329 B1 | * | 10/2002 | Livschitz | 707/1 |
| 6,629,198 B2 | * | 9/2003 | Howard et al. | 711/112 |
| 2005/0086241 A1 | * | 4/2005 | Ram et al. | 707/100 |

OTHER PUBLICATIONS

Li, Jinyuan, Krohn, Maxwell, Mazieres, David, Shasha, Denise, "*Secure Untrusted Data Repository (SUNDR)*" NYU Department of Computer Science pp. 1-16.
http://backuppc.sourcesforge.net/faq//backuppc.html p. 1-13, Dec. 18, 2004.
http:// www.usenix.org/events/hotos03/tech/full_papers/henson/henson_html/hash.html "*An Analysis of Compare-by-hash*", Van Henson Sun Microsystems Nov. 3, 2004 pp. 1-22.
http://blogs.sun.com.val SHA-1 Weakened, all other hashes broken, Tuesday Aug. 17, 2004, p. 1.
http://rsync.samba.org/documentation.html Dec. 12, 2004.
http://hssl.cs.jhu.edu/ip-rsync/node3.html Nov. 15, 2004 pp. 1-2.
http://samba.anu.edu.au/rsvnc/how-rsync-works.html "How Rsync Works A Practical Overview" Dec. 12, 2004 pp. 1-5.
Abrahamson, Jeff, "Cryptar: Secure, Untrusting, Differencing Backup" Department of Computer Science Drexel University; Object Recognition and Applied Algorithms Lab, Philadelphia, PA, Jan. 22, 2004.
http://lists.samba.org/archive/rsync/2003-October/007450.html
Felice, Jason M., "versioned files (take 2)" pp. 1-2 Dec. 18, 2004.
Quinlan, Sean and Dorward, Sean "Venti: a new approach to archival storage" Bell Labs, Lucent Technologies pp. 1-13.
Wu, Kun-Lung and Yu, Philip S. "Local Replication for Proxy Web Caches with Hash Routing" IMB T.J. Watson Research Center pp. 69-76.

(Continued)

*Primary Examiner*—Shin-Hon Chen
(74) *Attorney, Agent, or Firm*—Holland & Hart LLP

(57) ABSTRACT

Methods are provided for detecting the processing status of data blocks. A hash value is used at times in place of a block's data content, thereby reducing processing of the block. Superblocks and superblock hash values are used to manage collisions between hash values of individual blocks, in order to reduce or eliminate the risk that blocks having different content will be treated as though they have the same content merely because they have the same hash value. Systems and configured storage media are also provided.

24 Claims, 6 Drawing Sheets

OTHER PUBLICATIONS

Spring, Neil T. and Wetherall, David "A Protocol-Independent Technique for Eliminating Redundant Network Traffic" Computer Science and Engineering, 352350 University of Washington pp. 1-9.

Muthitacharoen, Athicha, Chen, Benjie: and Mazieres, David "A Low-bandwidth Network File System" MIT Laboratory for Computer Science and NYU Department of Computer Science pp. 1-14.

Cox, Landon P., Murray, Christopher D.; and Nobel, Brian D. "Pastiche: Making Backup Cheap and Easy" Department of Electrical Engineering and Computer Science University of Michigan pp. 1-14.

Sapuntzakis, Constantine P., Chandra, Ramesh, Pfaff, Ben, Chow, Jim, Lam, Monica S., Rosenblum, Mendel Optimizing the Migration of Virtual Computers Proceedings of the $5^{th}$ Symposium on Operating Systems Design and Implementation (2002) pp. 1-14.

Rauch, Felix, Kurmann, Christian and Stricker, Thomas "Partition Repositories for Partition Cloning—OS Independent Software Maintenance in Large Clusters of PC's" Proceedings of the IEEE International Conference on Cluster Computing (2000) pp. 1-10.

Jeong, Jaein and Culler, David "Incremental Network Programming for Wireless Sensors" IEEE Second 2004 UC Berkely, EECS. pp. 1-21.

* cited by examiner

US 7,634,657 B1

REDUCING THE PROBABILITY OF UNDETECTED COLLISIONS IN HASH-BASED DATA BLOCK PROCESSING

FIELD OF INVENTION

The present invention relates generally to computer data processing, and more particularly relates to the use of hash values in data backup and in other data processing systems and methods.

BACKGROUND OF THE INVENTION

Computer data is often stored, generated, or otherwise organized in blocks. For instance, data is often transmitted in networks, or stored on disks and other nonvolatile media, in packets or sectors which have a fixed size. Each packet or each sector of data may then constitute a block. Sometimes packets or sectors are grouped into clusters to form blocks. At times, data is organized in blocks which are not necessarily multiples of a sector in size, particularly when data is created or manipulated in memory by software or I/O operations. Sometimes the blocks of interest are all the same size; sometimes they are not. Sometimes block size is constant for the duration of processing; sometimes it is not. Sometimes blocks are called by other names, e.g., sectors, clusters, packets, records, and so on.

Regardless, it is often useful to organize data in blocks in order to process such blocks individually. In some cases, blocks are used to organize data to help make a distinction between blocks that have been processed and blocks that have not been processed. In some cases, it is helpful to track the number of times (zero, one, two, and so on) that a given block has been processed. Sometimes it is useful to know whether two blocks contain the same data, so that the data itself can be processed exactly a certain number of times, or at least a certain number of times, or no more than a certain number of times, regardless of which block(s) contain that data.

One way to determine whether two equal-sized blocks contain the same data is to compare each byte (or bit) within one block to the corresponding byte (or bit) in the other block. In such comparisons, "corresponding" may mean "at the same offset from the start of the block" or it may have some other meaning, so long as the meaning is well-defined. But in addition to simply comparing the blocks' data, there are other ways to determine, with acceptable certainty, whether two blocks contain the same data. Examples are given later in this document.

Data processing may involve one or more operations of various types on data blocks. Some of the many possible examples of data processing include transmitting data blocks to another computer; sending data blocks to an I/O device such as a monitor or disk storage unit; comparing data block contents to other data; generating new data based on the given data blocks; using data to control movement, flow, temperature, pressure, sound, or other physical parameters outside the processing computer; transforming the data; and reorganizing data blocks and/or the data they contain. It may be useful in such processing to determine whether a given data block has been processed, and/or to determine whether data in one block is the same as data in another block.

The present invention provides certain combinations related to data processing. It is not necessary for every aspect of every inventive combination presented herein to be individually unknown prior to this presentation. Additional information about particular individual known features, precursors, and proposals preceding the present invention may be found elsewhere in the present application document and the application file. It is in this context, then, that the present invention is discussed.

BRIEF DESCRIPTION OF THE DRAWINGS

To help illustrate the present invention, a description of the invention will be given with reference to the attached drawings. These drawings only illustrate selected aspects of the invention. Features shown in the drawings are not necessarily required in every embodiment of the invention. Also, embodiments may include features that are adequately disclosed but not shown in detail in the drawings. In short, the drawings do not, by themselves, fully determine the invention's scope.

DETAILED DESCRIPTION

Figure 1:
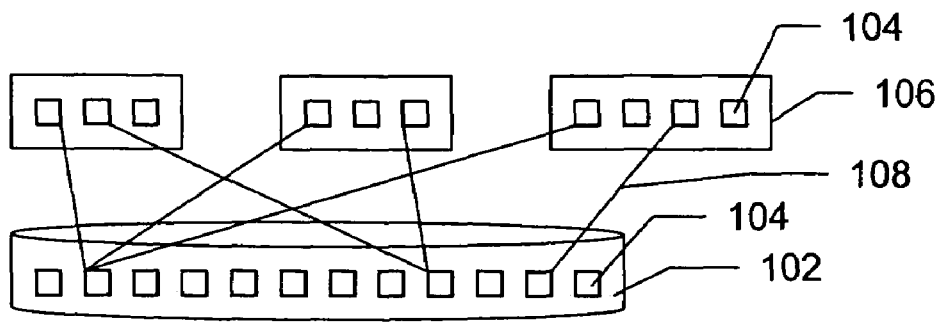
FIG. 1 is a diagram illustrating a cluster store which contains blocks.

In describing the invention, the meaning of important terms is clarified, so the claims must be read with careful attention to these clarifications. Specific examples are given to illustrate aspects of the invention, but those of skill in the relevant art(s) will understand that other examples may also fall within the meaning of the terms used, and within the scope of one or more claims. Words used herein do not necessarily have the same meaning they have in everyday usage, in dictionaries or treatises, in other publications, or elsewhere. Terms may be defined, either explicitly or implicitly, here in the Detailed Description and/or elsewhere in the application file.

As used herein, a "storage device" is a device that provides computer-readable non-volatile storage. Thus, "storage" refers to non-volatile storage. Examples include, without limitation, individual disks, RAID storage, and flash memory. A storage device is not necessarily limited to a single location. For example, mirrored disks separated by hundreds of kilometers may be viewed as a single storage device. Likewise, a "storage farm" having hundreds or even thousands of disks may be viewed as a single storage device if one is storing a relatively large amount of data, e.g., terabytes or more.

A "hash value" (also called a "hash") is a value calculated from digital data, which serves to distinguish that data from other data. A hash is relatively short compared to the data from which it is calculated. The word "hash" may also be used as a verb, meaning "to calculate or otherwise obtain a hash value". In this document "hash" includes at least creation of CRCs, other checksums, message digests, fingerprints, and other data summaries which require fewer bits than the data they summarize and which tend to change when the data is changed. A hash may be stored in a sole variable, a hash table, a balanced tree, a linked list, a record, a certificate, and/or another data structure.

"CRC" stands for Cyclic Redundancy Check, which is also sometimes referred to as a Cyclic Redundancy Checksum or a Cyclic Redundancy Code. A CRC is a hash. Not all hashes are CRCs.

Cluster Stores Generally

The present invention relates to processing data in blocks. As noted in the Background section above, the term "block" is broadly defined. One example of a block is a cluster. A "cluster" is a fixed-size block that is used as the allocation unit by some file systems, including without limitation many Microsoft Windows-brand file systems. On most Microsoft Windows XP-brand systems with the Microsoft NTFS-brand file system, for instance, the cluster size is typically 4K. In the imaging/backup space of computer processing, the cluster size of a file system may be a convenient size to use as the block size for imaging, mirroring, replication, archiving, retrieving, comparing, recovering, and other processing.

"Processing" is used in a broad sense in this document, to include any set of one or more operations performed by software and/or hardware on digital data, or operations producing digital data as a result. One example of processing is backing up clusters of digital data, from one part of a computing device to another part of that device, and/or to another computing device. For purposes of backing up data, a storage device is considered to be a computing device, even if its operations are limited to I/O operations.

To increase understanding of the present invention, we now consider various types of cluster stores as examples of processing data in blocks. A "cluster store" is a way of compressing data by identifying identical blocks of data, and storing each unique block exactly one time. This technology may also be referred to as a "single instance cluster store" (SICS).

FIG. 1 illustrates single instance cluster stores in general. A storage device 102 contains copies of blocks 104 of data. The data is backed up to the storage 102 from one or more data sources 106, such as individual computers or individual image files. Some correspondence 108 exists so that a full sequence of blocks 104 representing a given data source 106 can be restored or replicated if need be. The diagram in FIG. 1 does not show every such correspondence 108. However, it does show multiple source blocks in correspondence with a single stored block, to emphasize the purpose and nature of a SICS, which is to reduce storage requirements by reducing storage of redundant data.

In some situations using many computers, such as in enterprises or Original Equipment Manufacturer (OEM) configuration factories, duplicate blocks are quite common in the data one works with. As the same computers within a given organization are backed up again and again, for instance, it often happens that much of the data is unchanged and that the backup duplicates data blocks that have previously been stored. For example, it is often true that most of the computers in an organization contain the same OS, running on a small number of hardware platforms, so that many have the same device drivers. An application installed on one computer in the organization is very likely to be installed on others, and quite possibly on all other computers in the organization. A document created by one person is often shared with others and copied to their computers. When an upgrade or patch is installed on one computer, it goes out to many. Thus, there is often a large amount of duplicate data between the computers in an organization. A SICS for this organization will identify all of this redundancy and only store a single instance as part of the backup, so that a full backup of the entire organization may not be much larger than the backup of a single computer.

Incremental images attempt to reduce such redundancy by only capturing newly written disk sectors or clusters, but they still often include much duplicate data. One common reason for redundancy in incremental images is the rearranging of clusters by disk defragmentation programs. Duplicate blocks can also come from programs such as word processors that don't save new versions of a data file over the top of the existing file, but rather create a new copy and delete the original file only if this new file creation is successful; this relocates data that is often largely unchanged or only appended to. Another limitation with incremental images is that it is usually impractical to take incremental images forever; periodically one must take another base image.

Single instance cluster store technology identifies duplicate blocks, regardless of where they occur or how long it has been since one was previously seen. As a result, over time a single instance cluster store can be much more space-efficient than a base image with incrementals. This is especially likely if one wants access to all previous backups.

A key to single instance cluster store technology is efficiently identifying duplicate blocks. This identification may be done in various ways.

Cluster Stores Using a Short Hash with Index

More than one year prior to the earliest priority date of this patent document, a team at PowerQuest, including the present inventor, designed and prototyped a particular type of SICS for a potential OEM customer, Compaq Corporation. This led to the filing of confidential U.S. provisional patent application Ser. No. 60/336,214 filed Nov. 2, 2001 for Computer Data Delta Imaging Tools and Techniques ("the '214 provisional"), which is incorporated herein in its entirety by reference. The section titled "Image Store Variant", which is found on pages 2-4 of the '214 provisional, may be of particular interest. Other PowerQuest patent applications and PowerQuest patents are also identified in the '214 provisional, including U.S. application Ser. No. 09/532,223 (now U.S. Pat. No. 6,615,365), U.S. application Ser. No. 09/810,874, U.S. application Ser. No. 09/942,234, U.S. Pat. No. 6,615,365, U.S. Pat. No. 6,253,300 and U.S. Pat. No. 6,108,697. Symantec Corporation is not mentioned, as the '214 provisional was filed prior to the December 2003 acquisition of PowerQuest by Symantec, but Symantec's Ghost-brand imaging software is mentioned.

The OEM had a large set of similar images that were being installed on machines on a factory floor. The PowerQuest design effort had two main goals. One was to reduce the amount of space required to store all of these images. The other goal was to reduce the bandwidth required to duplicate new images between factories.

Figure 2:
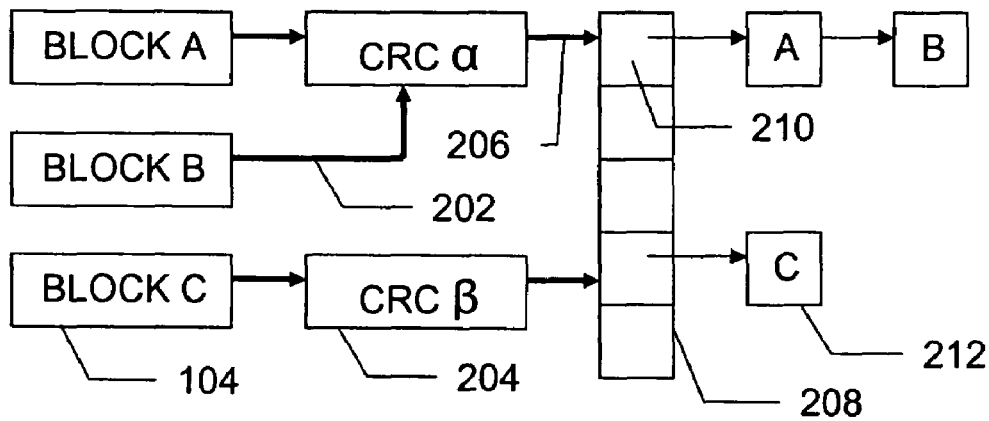
FIG. 2 is a diagram illustrating a CRC-based approach to determining whether blocks have been added to a cluster store.
Figure 4:
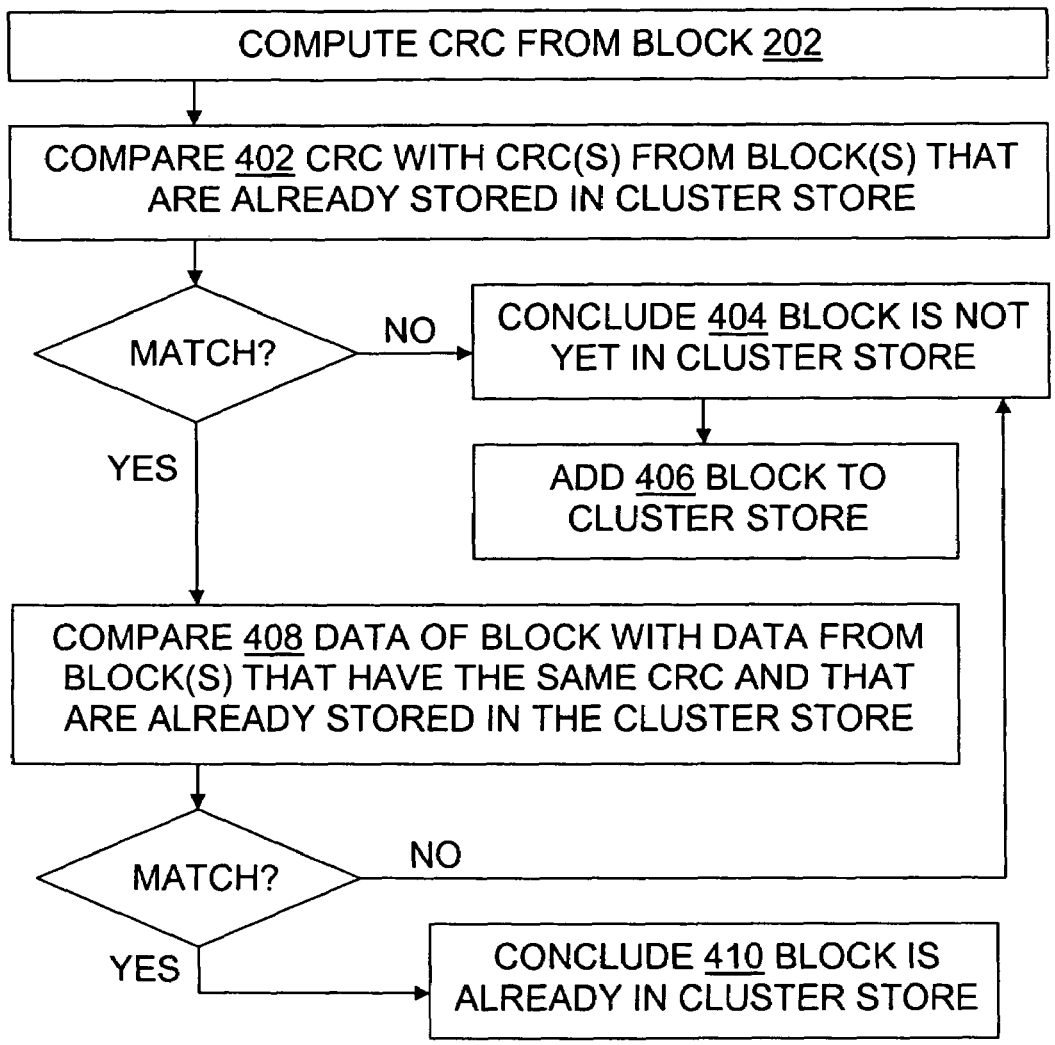
FIG. 4 is a flowchart further illustrating a CRC-based approach to determining whether blocks have been added to a cluster store.

As illustrated in FIGS. 2 and 4, this design used a particular algorithm for identifying duplicate blocks 104. The algorithm involves computing 202 a CRC value 204 for each new block of data, and then comparing 402 that CRC to the CRC values of blocks already in the SICS. If the CRC is unique (as with block C in FIG. 2), then the algorithm concludes 404 that this is a unique block which must be added 406 to the SICS. If the CRC is not unique (as with blocks A and B in FIG. 2), then for each block in the SICS with this CRC, the data bytes are compared 408 to the new data block to see if they match. If it is a unique block, it is added to the end of the SICS data file, but if the data matches, the algorithm concludes 410 that the block is already in the SICS. This approach is called the "Short Hash with Index" (SHI) approach to cluster stores. The present invention can also use CRCs, but differs in other respects from the early design effort.

FIG. 2 illustrates a situation in which three blocks 104 each contain different data, but two of the blocks have data that hashes to the same value (CRC alpha). The CRC values 204 point 206 into a hash table 208, which contains linked lists 210 of offsets 212 into the SICS storage 102. Other hash table implementations may also be used, such as one in which offsets matching blocks whose hashes collide are stored in successive array entries rather than linked lists. The particular hash data structure used is not as important as the fact that collisions can occur, and the fact that they are resolved by comparing the actual data stored in blocks whose hash values collide.

In a SHI design, the hash table structures can be implemented to allow a list of all of the CRC values (at least) to reside in memory, so that checking a new block only has to go to disk if the CRCs match. Thus, if there is a CRC match, one disk read may be all that is needed to determine that it is a duplicate, and if the CRC does not match then one disk write adds it to the SICS, so each block can be processed with a single I/O call on average.

The CRC space can be designed to be large enough so that the majority of the time that a CRC matches, the data also matches. For instance, consider a CRC size of 32 bits. As a rough estimate, 32 bits allows space in the SICS for about $2^{32}$ blocks of 4K bytes each, representing $2^{32}*4K=2^{44}$ bytes or about 16 thousand gigabytes of data, ignoring hash collisions. A CRC size of 40 bits would provide even more storage capacity and/or even fewer CRC collisions that require comparison of the actual data (as opposed to comparison of different CRCs based on the data).

Figure 5:
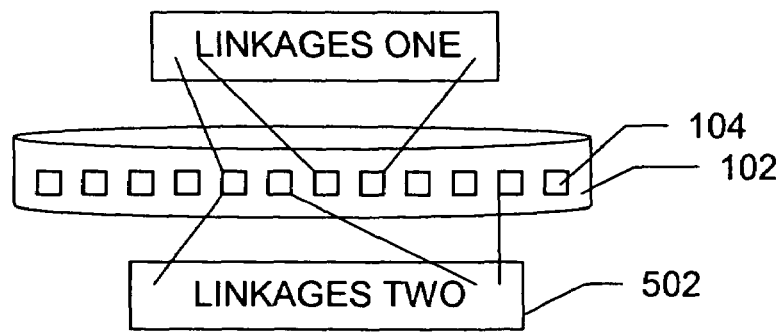
FIG. 5 is a diagram illustrating linkage files which define images as ordered sequences of offsets into a cluster store.

In a particular design, an image file is simply an ordered set of blocks, represented by a linkage file. FIG. 5 illustrates two linkage files 502, each of which is an ordered set of references to blocks 104 in a SICS 102. Blocks are identified within the SICS by their index or offset within the SICS data file. These indexes could be 32-bit or 40-bit values, for instance, depending on the size of the SICS.

Often when a new block of data is added to the SICS, it comes from a new application or data set and many of the following blocks will also need to be added. This creates a large run of sequential indexes that can be stored very efficiently, e.g., by specifying an initial offset and the number of following consecutive offsets in the run. Also, the next time that this application or data set is seen, the blocks are usually in the same order, so again one gets a large run of sequential indexes. As a result, the linkage file can sometimes be very compact, such as $1/10,000^{th}$ the size of the original data, or even less.

Once data is added to this SICS, it is never modified. New data is always added to the end. Because of this, when a new image is added to the SICS, it can be replicated to another site (e.g., another factory) quite easily, by merely transferring the linkage file, and transferring any new data added to the end of the SICS, which is typically much smaller than transferring a full image.

One of the limitations of this SHI SICS design is that it is difficult to remove obsolete data when it is no longer needed. When an image or a set of images becomes obsolete (because of the release of a new operating system, for example), the obsolete blocks in the SHI SICS cannot be re-used. Re-use would interfere with replication—a data block would no longer be uniquely identified by an offset, since a given offset would be used to identify different data blocks at different times. Timestamps, version numbers, or other means could be used to determine which block contents are intended by a particular use of an offset, but recourse to comparison of actual data in response to CRC collisions would still be used with these alternatives.

Cluster Stores Using a Unique Hash

After the PowerQuest SHI work, Sean Quinlan and Sean Dorward of Bell Labs published a paper on a file system they designed for archival storage, titled "Venti: a new approach to archival storage". This and other papers discussed herein can be found online or, in due course, in the public record of the present application file. The Venti paper's approach, as adapted for use in a SICS, is called here the "Unique Hash" (UH) approach to cluster stores.

The Venti paper describes an approach that is similar to a SHI SICS in that it identifies unique blocks and stores only a single copy, and ideas in the Venti paper may be adaptable for use in a SICS. The Venti paper also suggests taking linkage data, breaking it into blocks, and storing these blocks in the archive (e.g., SICS) as well, so that only a single archive reference is needed to reconstruct a full system backup.

However, there are also some significant differences between the Venti design and the PowerQuest SHI SICS design. In particular, there are differences in the way that each approach detects unique blocks (blocks having different data content), and in the way that each references the stored blocks.

Figure 3:
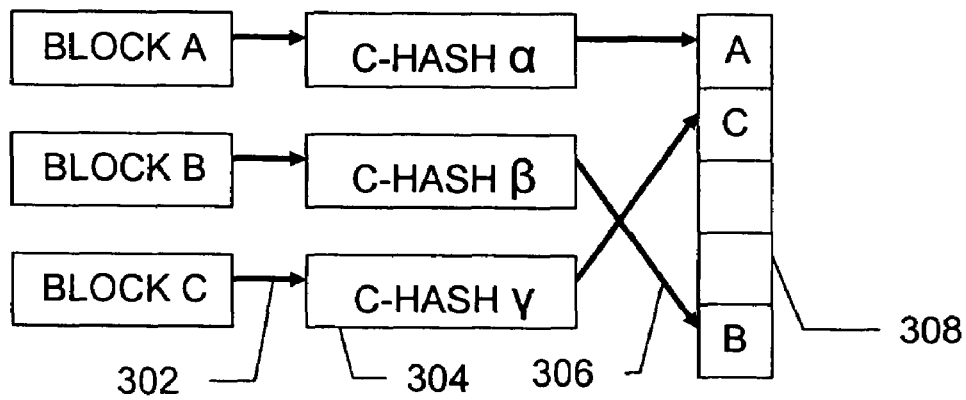
FIG. 3 is a diagram illustrating a cryptographically-strong-hash-based approach to determining whether blocks have been added to a cluster store.
Figure 6:
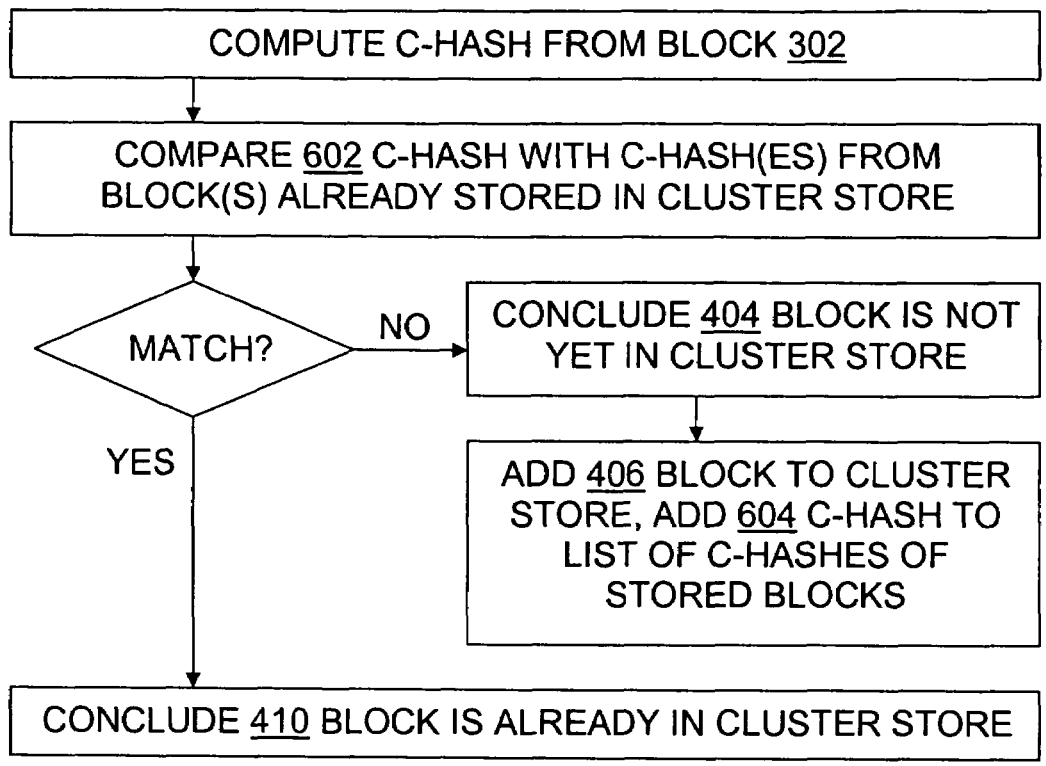
FIG. 6 is a flowchart further illustrating a cryptographically-strong-hash-based approach to determining whether blocks have been added to a cluster store.

As illustrated in FIGS. 3 and 6, the UH approach uses a cryptographically strong, collision-resistant hash function to uniquely determine if two blocks of data match. With a cryptographically strong hash algorithm, given any block of data, it is understood to be computationally impossible (in our lifetime) to find another block of data that has the same hash value. Thus, under UH if we see that two blocks of data have the same hash value, they are treated as having the same content.

Blocks are cryptographically hashed 302 to produce cryptographically strong hash values 304, which are used to index 306 into a table 308 of block locations in SICS storage 102. In the illustrated situation of FIG. 3 there are no collisions; each block produces a different hash value, unlike the SHI approach.

In their paper, Quinlan and Dorward state the probability p of a collision as:

$$p \leq n(n-1)/2^b \quad (1)$$

where n is the number of unique blocks in the archive (the SICS, in our case) and b is the number of bits in the hash value. UH under the Venti approach uses the Secure Hash Algorithm (SHA-1) developed by the United States National Institute of Standards and Technology. This hash algorithm produces a 160-bit (20 byte) hash value. For an exabyte of unique data (one million terabytes) using 4K blocks, this makes $n=2^{60-12}$. Thus, under formula 1 above, the probability of a collision with an exabyte of unique data is less than $\frac{1}{2}^{64}$ (i.e. $2^{48}*2^{48}/2^{160}$), or one in sixteen million trillion. If the unique data size is more on the order of a terabyte (which is more typical for a SICS meeting today's requirements), then one adds nine zeros to the above number (one in a million billion trillion).

After UH computes 302 the hash of a new block 104, it compares 602 the hash value just computed with hash values of blocks already stored in the SICS. If none match, it concludes 404 that the block has not yet been placed in the SICS, so it adds the block to the store 102 and adds 604 the hash to the hash table. (Although not shown, the SHI algorithm similarly adds CRCs to the set of CRCs representing stored blocks when it determines the CRC'd block needs to be added to the SICS.) If the UH approach finds that the hash value already occurs for a block within the SICS, then unlike SHI, it does not do a byte for byte compare of the blocks. Instead, UH simply assumes 410 that they are the same. That is, UH assumes that two blocks which have the same hash necessarily also have the same underlying data on which computation of the hash value was based. This may seem unsafe, but the odds above suggest it should be safe.

However, even with this extremely low probability, not all researchers are convinced that this is a safe thing to do with user data. A skeptic's overview can be found in an online posting by Val Henson of Sun Microsystems, titled "An Analysis of compare-by-hash", which is available at the Usenix dot org site and elsewhere. In particular, Henson argues that "rsync is an appropriate use of compare-by-hash, whereas LBFS, Venti, Pastiche, and Stanford's virtual machine migration are not."

Avoiding the comparison reduces I/O on inserts of block data into a UH SICS. However, because the hash values are larger (about four times the size of SHI hashes), it is less likely with UH that the whole hash table can be held in memory on a system, so I/O may be required to access the hash as part of detecting duplicates. Therefore, adding new data to the SICS using the UH algorithm is approximately equivalent to slightly more expensive than with the SHI algorithm (as long as the SHI algorithm's hash table can fit in memory). The computation of the SHA-1 value 304 also requires significantly more CPU time than computation of the CRC used by SHI.

Figure 7:
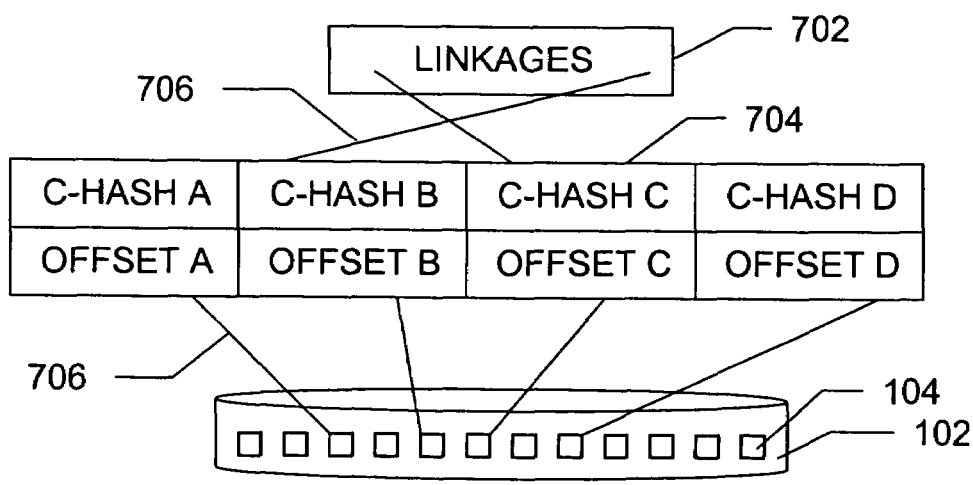
FIG. 7 is a diagram illustrating a linkage file which defines an image as an ordered sequence of cryptographically-strong-hash values, which correspond in turn to offsets into a cluster store.

As illustrated in FIG. 7, a linkage file 702 in UH can also differ from an SHI linkage file. Rather than storing a block's index into the SICS data file, UH stores its unique hash value; linkage files include an ordered sequence of hash values 304. Accessing the data 104 involves using a hash table 704 to map 706 a specific hash value back to its corresponding data in the SICS. This allows one to check that the data pulled out matches what was put in, because it should hash to the same value. Moreover, if the data in the SICS is rearranged (such as by removing obsolete data), the linkage data is still valid, although the table 704 must be updated with new offsets.

However, UH also has two substantial costs. First, the linkage data now consists primarily or exclusively of hash values that are about four times bigger than the corresponding indexes and they don't compress at all, so the linkage file is often fifty times larger than the SHI linkage file ($\frac{1}{200}^{th}$ the size of the data versus $\frac{1}{10,000}^{th}$). Second, a hash table is required to restore data. If the hash table does not fit in memory, each block read from the SICS requires two or more I/O operations rather than the single I/O required by the SHI algorithm, which can directly access the data via its index.

Cluster Stores Using a Unique Hash with Index

With an understanding of the SHI and UH algorithms, one can also envision a modification to the UH algorithm which substitutes indexes for the hash values used as references. That is, the linkage file resembles FIG. 5 rather than FIG. 7, even though the procedures for adding blocks to the SICS correspond with FIG. 6 rather than FIG. 4. This approach would allow the linkage data to be identical to the SHI algorithm with the reduced memory and I/O for restoring data, since the hash table would no longer be needed for the restore. This approach is called Unique Hash with Index (UHI).

Building on What was Learned with Cluster Stores

With an understanding of the invention, one can build in various ways on the resources, processes, experiences, and other attributes gained by way of SHI and UH cluster stores. One such possibility is UHI cluster stores. Other possibilities in the backup/imaging arena include use of SHI, UH, or UHI for improved efficient replication, primary/secondary backup locations, reducing network bandwidth of backups, and/or data management and analysis. Another set of possibilities relates to improvements to the use of hashes (CRCs, C-hashes, or otherwise) for detecting blocks whose data has already been stored in a cluster store, or replicated, or transmitted over a network, and so on. Yet another set of possibilities arises from the realization that other types of block-oriented data processing, which are not necessarily in the backup/imaging arena, can use hashes to detect processed blocks. It will also become apparent that these various possibilities may overlap or complement one another in some situations.

We now explore in more detail some examples of these possibilities. The scope of the present invention is not limited to these particular examples. Examples are provided to enhance understanding, not to implicitly exclude other embodiments of the invention.

Networked Cluster Stores with Superblock Hash

A SICS can be designed for use on (or otherwise within control of) a server. The server SICS allows one to consolidate data (e.g., disk images) from multiple systems into a single, more efficient storage archive. In particular, in a configuration like the one illustrated in FIG. 12, a UH approach or a UHI approach can be used with a status determiner 1202 to determine which blocks 104 have been transferred from a client 1204 across a network 1206 to a server 1208 to be placed in a SICS storage 102 that is managed by the server. The status determiner 1202 can be implemented using software 1406 to configure general-purpose computing hardware, firmware, and/or ASICs, PALs, FPGAs, or other special-purpose hardware.

In some embodiments implementing a UH or UHI SICS across a network 1206, hash values 1210 are first sent from a client machine 1204 to the SICS server 1208. (The hash values are designated 1210 in FIG. 12 because they may be cryptographically strong hash values 304, as in UH/UHI embodiments, or they may be other hash values in other embodiments.) If the SICS server 1208 indicates that clusters (blocks 104) with the hash values are already present in the SICS' set 1212 of processed (stored) blocks' hash values, then the corresponding data blocks 104 do not need to be sent from the client to the server. Assuming 4K data blocks and 160-bit (20 byte) hash values, this results in about a 200-times reduction in network bandwidth usage.

However, there is a very slim possibility that two different data blocks could share the same hash value, even in a UH/UHI system, as discussed above and noted in the online article by Val Henson. If one of these equal-hashing blocks 104 is already in the server SICS, and the client contains an instance of the other one, then the UH/UHI algorithm will incorrectly say that they are the same, and will not store a copy of the client's block in the server SICS. The backup of the client 1204 into the server SICS will actually be corrupt, but this fact may not be detected or become apparent until much later.

The present invention provides systems and methods for detecting that a hash collision has occurred, so that the collision can be handled in an appropriate way, such as by backing up the client's block. Note that if we want to deal with the case where multiple blocks may have identical hashes, then we cannot use the same UH algorithm described earlier in this document, because it assumes that a hash value uniquely identifies a data block. The previously described UHI and UH algorithms (at least) can be modified to handle this, as follows, with reference being made to FIGS. 12-14 for examples.

As a given client 1204 checks hash values 1210 against the SICS set of hash values 1212, if the hash for a given block doesn't match, the client sends that full block 104 to the server 1208. In the unmodified UH/UHI design, if the hash matches, one simply assumes the blocks are the same. But in some embodiments of the invention, this is modified, in that the client 1204 collects these "matching" blocks into a superblock 1402 of some number of blocks, such as 256 blocks, for example. The server 1208, knowing which hash values the client 1204 has attempted to match, pulls what are apparently these same blocks 104 from the SICS 102 into its own copy of the superblock. Whether the blocks are actually the same is the determination to be made, using comparison of superblock hashes.

When the superblock 1402 is full, both client and server compute a hash of their own superblock, and then one of them compares their respective hashes. If any of the data blocks in the client superblock differ from server's data blocks, then with SHA-1 as the hash algorithm, the probability that we won't detect the difference is about $2^{-160}$ (on top of the already small probability of not detecting it with the original hash). The increased network traffic for this is 160 bits per 256 blocks or less than one extra bit per block. With this algorithm we effectively get the error rate of a double SHA-1 algorithm (320 bits), but incur a penalty in network bandwidth of less than 1%. It also allows us to keep the hash table/b-tree the same size (160-bits). There is a small amount of additional overhead on the client to cache the superblock and compute its hash. There is a larger cost on the server, where the server process now needs to read each matched data block, doubling the amount of I/O (from the single I/O needed for the hash table). There is also now on the server the cost of computing each superblock's hash, where otherwise the server does not compute any hashes, thus significantly increasing its CPU usage.

Retrieval of blocks 104, hash computations, tracking of the number of blocks retrieved, transmittal of superblock hash values for comparison, and other superblock-related operations are performed by a superblock status determination module 1404 and/or by one or more other processing modules 1214. Processing modules may also serve administrative functions, such as profiling, notifying personnel, logging, and so forth.

Figure 13:
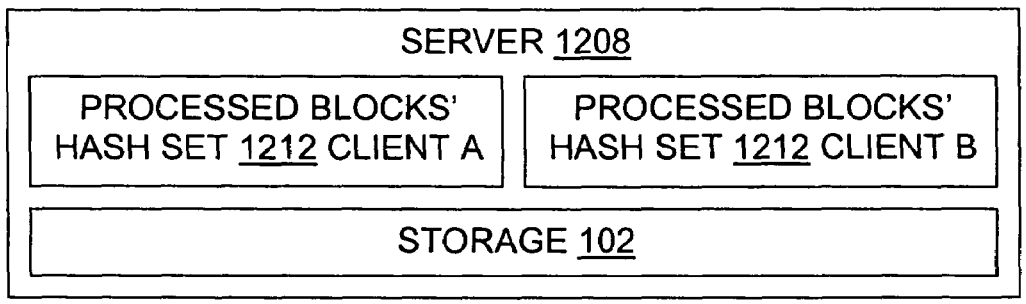
FIG. 13 is a diagram illustrating an alternate server configuration which may be used in some systems and methods that determine whether blocks have been processed.

Different embodiments may place particular functionality in different modules and/or at different locations. For example, in some embodiments the client sends hash values to the server and the comparison with processed block hash values is done on the server, whereas in other embodiments the server updates its clients with the current set 1212 of processed block hash values, and the hash comparison to detect unprocessed blocks occurs on the client. As another example, in some embodiments a single set of processed block hash values is maintained for all clients, while in other embodiments a distinct set 1212 is maintained for each individual client, as indicated in FIG. 13.

It may happen that one using the invention finishes a backup before the superblock is full. The embodiment should still calculate the superblock's hash. But in the case where the superblock contains only a single data block, the hash will be the same value as the original hash, and the embodiment as described thus far might not detect an error. One can work around this by adding 820 at least one extra block 1408 to the superblock, where the extra block 1408 contains one or more random values generated using a common seed value on both the client and the server. That is, in some embodiments, the step of calculating 822 a superblock-hash-value occurs after a data-block 1408 which contains generated random content is added 820 to the superblock.

Some embodiments generate a random block for each superblock. The random number generator for each superblock is seeded with the same initial value, so that each superblock will contain the same random data. As a result, if SHA-1 (or whatever hash function is used) is ever broken, the use 820-826 of client-server-coordinated random blocks 1408 thwarts the efforts of a wrongdoer to generate data that causes collisions without the collisions being detected, since the wrongdoer will not know the extra random value(s) of the superblock.

To further reduce the risk of an undetected collision, some embodiments may use different hash algorithms for block-processing and superblock-processing, such as SHA-1 for block processing and SHA-256 for superblock processing. Then if either algorithm is ever broken, the alternate algorithm will likely not be broken by the same pattern of data.

Taking the superblock idea one step further, some embodiments reduce the number of bytes of the SHA-1 value (for instance) used in the comparison for each data block. If we only use 128-bits of the 160-bit SHA-1 value for a block, then the chance of the 128-bit value falsely matching another block's 128-bit value is still very small, although it is larger than when using the full 160-bit values. However, by also using the superblock, the embodiment will detect if there are any false matches, in which case it can re-compare the individual data blocks using their full 160-bit SHA-1 values as the proxy for the actual data. The odds of a false match are still extremely small. However, this refinement reduces network bandwidth by an additional 20%, while still keeping the probability of not detecting a collision to about the equivalent of SHA-1 with 288 bits (160+128).

Another variation works as follows. For each data block compute its SHA-1 hash (for instance), then transform the data in some way and compute a second SHA-1 hash. The two hashes are combined into a 320-bit hash value, e.g., by abutting them or otherwise interleaving their bits, or by multiplying them. Using this larger hash value reduces the probability of an undetected collision by perhaps the same amount as the above algorithm. However, it does require increased computation, twice the network bandwidth, and a larger hash table. Then again, similar arguments could be made against stronger hash algorithms, such as SHA-256 or SHA-512.

Embodiments are not Limited to Cluster Stores

Although work on cluster stores provided precursors and thought-experiment environments for the present invention, and cluster stores can be implemented using the present invention, embodiments of the present invention are not limited to cluster stores. Other replication and remote-backup algorithms that use a hash to determine if a particular data block is already present at the remote location may also utilize inventive functionality. Moreover, tasks outside the imaging/backup arena may utilize inventive functionality. Some examples are given below. As with the other examples provided herein, these are meant to aid understanding of the invention, not to rule out additional uses, since it is not feasible (or required) to list herein each and every possible use of the invention.

As an example, consider a natural language translation system in which one process gathers textual documents in a first language and stores them in a RAID array, and another process retrieves documents from storage for translation (which could be computer-assisted or full machine translation). The same text may be encountered more than once, as the same story is repeated on different web sites or in different publications, for instance. In general, it may well be easier to gather documents than to translate them, so there will be a backlog of untranslated documents, and the translation service is thus a relatively scare resource that should be conserved. In particular, the process that is gathering documents would benefit from some ability to avoid storing multiple copies of the same text, so that scarce translation resources are not wasted by translating the same text more than once. Toward that end, the document-gathering-and-storing process could use hashes, in a manner described herein, to detect documents whose text has already been stored and to avoid storing a redundant copy of such text. Alternately, or in addition, it could use hashes to avoid translating the same text more than once, even if some redundant copies are stored.

Before turning to other specific examples, consider the impact that a system architecture may have in creating opportunities to use the present invention. In some architectures, such as some multi-stage signal processing architectures, the status of processing of a block of data is implicit in the block's present storage location. For instance, an architecture may be one in which a data block is not received at stage N+1 until it has been processed at stage N, so the invention is not needed to tell whether processing has occurred.

But in other architectures, data is stored, is then pulled later from storage to be processed, and the status of processing of a block of data is not implicit in the block's present storage location. Some examples include architectures in which a stream of data blocks flows into storage and the blocks are then retrieved from storage, in some other order than the order they were stored in, to be processed. Cluster store architectures like those consistent with FIG. 1 are an example, but there are many other possibilities as well. In such architectures, hashes and superblocks could be used as described herein to determine whether a block should be stored at all (if duplicates are not being stored) and/or used to determine whether a stored block contains the same data as some other block that was already processed (if duplicates are not being processed or if duplicates are processed in a different way).

As an example, consider an image processing system in which multiple raw visual images are the initial input, and the processing goal is to produce a single larger and clearer image from them. This could be useful, for instance, when a remote-controlled or robotic vehicle roaming an environment takes multiple small snapshots (in series and/or in parallel), and sends them back to a base over a low-bandwidth connection, to be used there in producing a larger and clearer image of the environment in question. The processing aligns the raw small images, and enhances them through signal processing, edge detection, and so on. In such a system, hashes of the constituent blocks which make up the raw small images could be taken and then used to detect overlapping areas of those small images. This could assist alignment of the smaller images when forming the larger montage or composite image. It could also conserve processing, if some processing is done on individual small images rather than the composite, by preventing processing of overlapping portions of the small images. The same image data would not be processed again when it is encountered in a second or subsequent small image.

Other forms of processing, such as numerical processing, statistical processing, compression/decompression, data transmission, data storage, encryption/decryption, and so on, can also use hashes and superblocks as described herein to efficiently detect blocks of data that have already been processed. This can be done without routinely comparing actual data, and also without simply assuming that the data is identical merely because the hashes are identical.

As yet another example, assume that a search engine has access to several databases, that some records appear in more than one database, and that the databases are not being changed but instead are merely being searched. This would be the case, for instance, in searches of past snapshots of the databases, such as searches of cached or archived web pages. Assume also that the user wishes to see exactly one entry for any given matching record in the results of a specified search. The search is to be made in more than one of the databases, so duplicate entries in the search results are theoretically possible. In this situation, the search engine could tag each record it encounters with a hash. Over time, more and more records (sectors, clusters, web pages, or other blocks) will be tagged, so the I/O and computation needed to do the tagging tends to decrease. By using the hash tags as described herein, the search engine could reliably and efficiently place each matching record in the search results exactly once.

Although many of the examples provided herein speak in terms of detecting processed (e.g., stored, transferred) blocks of data, and thereby distinguish between zero and one instances of processing, the invention may also be used in systems or methods that distinguish other processing counts. For example, it may be used to help distinguish between zero and N instances of processing, where N is a cardinal number, or between 1 and N instances, or between M and N instances (M,N being different cardinal numbers).

An example is provided by a multicasting peer-to-peer system. Assume N nodes are connected to each other, directly or indirectly, and that each can transmit to at least some of the others. Assume also that one or more of them, but not all of them, contain pieces (blocks or sets of blocks) of a dataset which is to be fully assembled on each of them. The dataset pieces are all there, but they are scattered among the nodes, and some of the dataset pieces are initially present on more than one of the nodes.

Perhaps the most obvious way to get a copy of every piece to every node is for each node to send every other node a full copy of all the pieces that node has. But this approach would send extra copies. Indeed, as a node receives pieces it lacked and begins sending them to all other nodes except the one they came to it from, the load on the network connections could be severe.

To reduce the network load, various approaches can be taken. For instance, the nodes could "elect" a single node to receive all the pieces from all the other nodes, which do not initially receive but only transmit, and which transmit only to the elected node. The elected node would ignore the duplicate pieces, and then transmit the full dataset to the other nodes. Alternately, the nodes could be placed in some order, and then take turns transmitting. Node 1 would send all its pieces to each of the other nodes, then node 2 would send all its pieces to each of the other nodes, and so on. There may certainly be other approaches as well. The point is that in many of these approaches, the invention could be used to reduce unnecessary transmission of the pieces. Hash values representing pieces could be transmitted instead of pieces, in many cases, with the pieces themselves being transmitted only when the nodes determine that is necessary, by using hashes and superblocks as described herein.

Methods Generally

FIGS. 8 through 11 illustrate methods of the present invention. The invention may be embodied in methods, in storage media configured to perform methods and/or configured by data structures that assist certain methods, and in systems, for example. Although we focus discussion on methods at this point, it will be understood that much of what is said in the text and shown in the drawings about method embodiments also helps explain configured medium and system embodiments, and vice versa. For instance, in some embodiments the status determiners 1202, 1404, and/or the processing modules 1214 include software which performs one or more of the methods illustrated in FIGS. 8-11. Likewise, some embodiments of systems (such as server 1208 systems and/or client 1204 systems) which include a means for determining the processing status of a block of data do so by including software and/or hardware which performs one or more of the methods illustrated in FIGS. 8-11.

Although steps are shown in a particular order in the figures, that is done in part for ease of illustration. Those of skill will appreciate that steps may also be performed in reversed or otherwise altered order, or concurrently, when the outcome of a given step is not needed before the commencement of another step. Steps may also be named differently, grouped differently, repeated, separated by intervening actions, and/or omitted, except as specifically required by the claims and/or by operability of the invention.

During an obtaining step (not shown), an embodiment obtains a data-block containing data contents. Data-blocks, which are also referred to as blocks above, may be obtained by receiving them from another computer, by generating them on the computer in question, by retrieving them from a storage device, or by other means. Hash values may likewise be obtained by calculating them, retrieving them, or receiving them. Note also that even though many examples in this document speak in terms of computers, other devices may also operate according to the invention, particularly if they include processing and memory elements for handling digital data. Thus, the invention may be used on stand-alone computers, networked computers, personal digital assistants, cell phones, other wireless communication devices, and other devices.

During a computing step 802, the embodiment calculates a data-block-hash-value based at least in part on the data contents of the block. This may include computing 202 a CRC, computing 302 a cryptographically strong hash, or otherwise computing a hash value. This step 802 may be accomplished using software and/or hardware, by using any of a variety of familiar or previously unknown hash functions. The characteristics of hash functions have been widely studied, and it will be understood that some experimentation may be helpful in selecting, writing, or fine-tuning a hash function. Step 802 may also be accomplished by looking up or otherwise retrieving a previously calculated hash value.

During an optional communicating step 804, the computing device in question transmits or receives the data-block-hash-value computed by step 802. All steps are optional, in the sense that they may be omitted from a given embodiment even though they are shown in the figures, unless that omission is contrary to the claim in question or operability of the invention. But the optional nature of step 804 also stems from the fact that some embodiments communicate hash values between computers, while other embodiments do not.

In some embodiments, the blocks are obtained at a given machine, their processing status is determined (using hash values, superblocks, etc.) at that same machine, and if not yet sufficiently processed they are then submitted for processing at that same machine. No communication of hash values to another machine is required. In a cluster store stand-alone embodiment, for example, the blocks could be retrieved from a laptop's working disk storage that holds user data and applications, their hash values could be computed on the laptop, and if they are not yet in a cluster store kept in disk space on the laptop that is dedicated for archival, then they could be added to that cluster store.

In other embodiments, hash values are communicated. Communication may be by network transmission or other data transfer between two or more computers, or between other computing devices configured according to the invention. Whether the hash values are transmitted, received, or both, depends on which embodiment and which machine defines one's perspective.

For example, in one embodiment each client 1204 computes the hashes 1210 for blocks in its working storage, and then it transmits 804 those hashes to the SICS server 1208. The server checks 806 the hashes it receives 804 from the clients against its own list of hashes 1212 of blocks it has stored in the SICS, and then it replies 804 to each respective client with a list of hashes received from the client and not found by the server in the processed blocks' hash set. Those hashes represent 808 blocks not yet stored in the server SICS. The other hashes sent do match, so the blocks for those hashes are added 816 to a superblock, which is then used 820-826 (as discussed more fully elsewhere herein) to determine which client blocks, if any, have the same hash but different data content than a corresponding server block and thus need to be added 1102 to the server SICS.

In another embodiment, the server 1208 transmits 804 to each client 1204 a copy of the hashes currently in the processed blocks' hash set 1212, and the clients then compare 806 those hashes with their own blocks' hashes 1210. In this embodiment the comparison 806 is done on the clients 1204 (in status determiner 1202 and/or processing modules 1214, for instance), whereas in the embodiment discussed in the immediately preceding paragraph, the comparison 806 is done on the server 1208. After the comparison, blocks whose hashes do not match 808 are sent 810 across the network 1206 to the server to be stored 812 in the server SICS. These blocks' hashes are also sent 804 to the server, which adds 814 them to the processed blocks' hash set 1212 in conjunction with adding 812 the corresponding blocks 104 to the SICS 102.

Thus, in some embodiments, the step 804 of receiving/transmitting the server's processed-superblock-hash-value over a computer network connection 1206 occurs before the step of comparing 824 it to the superblock-hash-value is done at the client. In other embodiments, the client's superblock-hash-value is received/transmitted over the network before the comparison is done at the server.

More generally, the invention provides methods which include determining 806 whether the data-block-hash-value appears in a set of processed-block-hash-values of data-blocks. The set of processed-block-hash-values may be implemented using a list, array, tree, or other data structure; the term "set" is meant to allow a wide variety of data structures in different embodiments. In particular, it will be appreciated that ordering the set 1212 of processed-block-hash-values can make the comparison 806 more efficient, but is not necessarily required.

Figure 8:
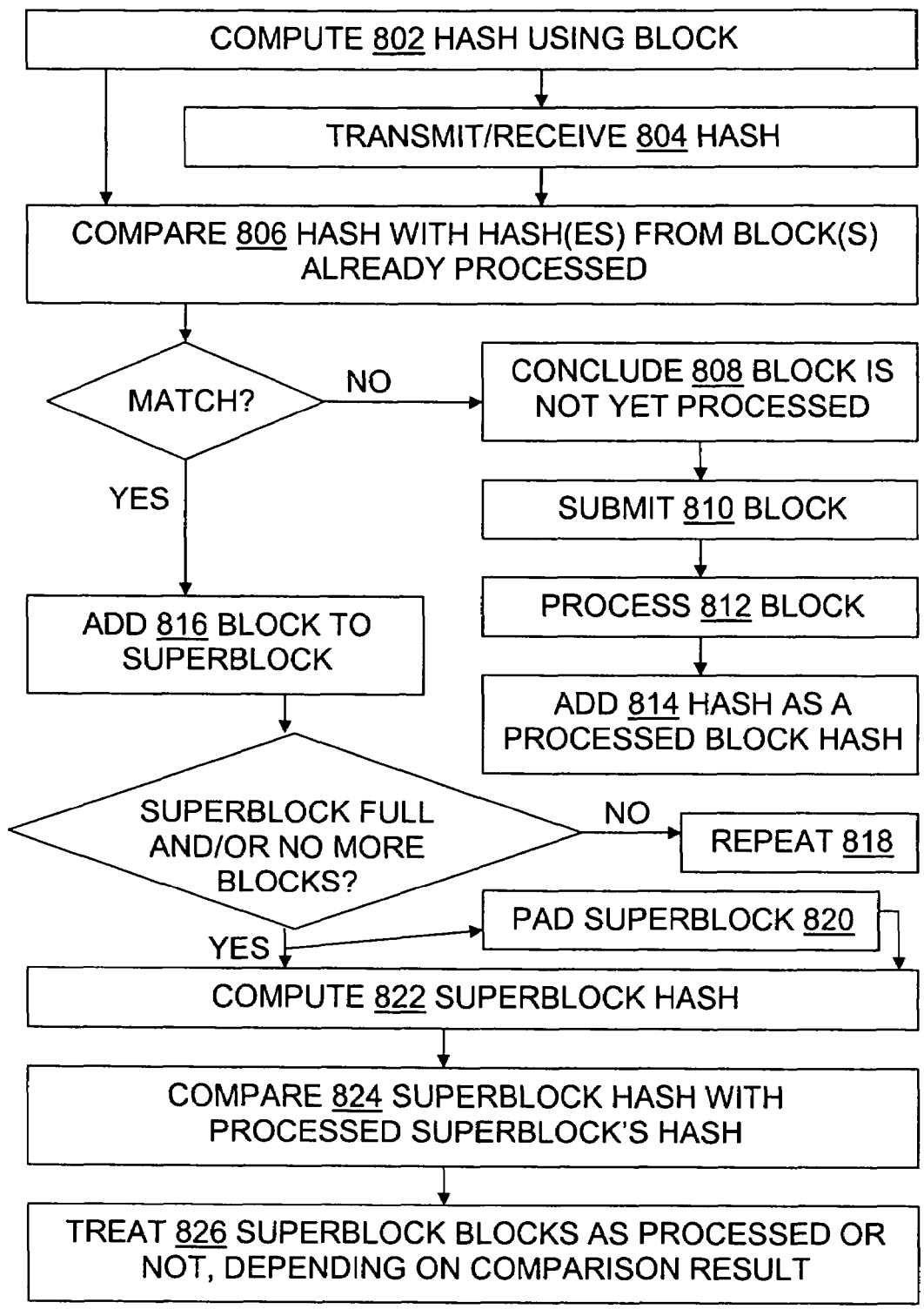
FIG. 8 is a flowchart illustrating a superblock-based approach to determining whether blocks have been processed.

If the data-block-hash-value was not in the set of processed-block-hash-values (indicated by the "no" branch of the "match?" decision diamond in FIG. 8), then the method includes concluding 808 that the block is not yet processed. This conclusion may be explicit, as evidenced by a message to a user, or it may be implicit, as in a step 810 of submitting the data-block for processing.

Subsequent processing 812 of the block may include transferring the data-block contents across a network link to a remote server computer as part of a data backup procedure, for example. But processing is not necessarily limited to the backup arena. Other processing 812 of blocks is also possible, including image processing, signal processing, encryption-related processing such as encryption and/or decryption, compression-related processing such as compression and/or decompression, translation, and so on.

The step 814 adds the data-block-hash-value 1210 to the set of processed-block-hash-values 1212 if the data-block-hash-value was not already in the set. Step 814 may be done on a client, a server, both, or a stand-alone machine, depending on the embodiment.

If the data-block-hash-value was in the set of processed-block-hash-values (indicated by the "yes" branch of the "match?" decision diamond in FIG. 8), then the method includes adding 816 the data-block 104 to a superblock 1402 of data-blocks. This may be done by retrieving the content of the block and copying it into a dedicated superblock region of memory, for instance, at an offset in that region determined by the number of blocks already added 816 and the size of each of those blocks (if uniform-sized blocks are being used). In some embodiments, the step of calculating 822 a superblock-hash-value occurs only after a predetermined number of data-blocks are added 816 to the superblock. In others, the client, the server, or either, may request calculation 822 and comparison 824 of the superblock hashes at other times, e.g., when the load on the CPU falls below a certain level.

The steps of comparing 806 hashes and adding 816 more blocks to the superblock may be repeated 818 until the superblock is full and/or there are no more blocks 104 for which processing status is to be determined. Alternately, hash-computing 802 and communicating 804 steps may also be part of the repetition 818. It is also understood that some hashes might not match, so steps 808-814 may be part of the repetition 818.

The step 822 of calculating a superblock-hash-value using the contents of data-blocks in the superblock may use the same hash function as step 802 of computing individual block hash values. Alternately, it may use a different hash function. In some embodiments, different individual block hashes are calculated 802 using different hash functions; the choice of hash function is coordinated between client and server.

In some embodiments, the superblock-hash-value has more bits than the data-block-hash-value, while in others it has the same number of bits, and in yet others it has fewer bits. One embodiment uses, for each obtained data-block in the superblock, a data-block-larger-hash-value which has more bits than the data-block's initially compared 806 data-block-hash-value. Treating 826 at least one data-block in the superblock as not yet processed if the superblock-hash-value does not match the processed-superblock-hash-value may then include determining whether the data-block-larger-hash-value appears in a set 1212 of processed-block-larger-hash-values of data-blocks. If the data-block-larger-hash-value was not in the set of processed-block-larger-hash-values, then the embodiment submits 810 the data-block for processing, but if the data-block-larger-hash-value was in the set of processed-block-larger-hash-values, then it treats the data-block as processed.

The step 824 of comparing the superblock-hash-value to a processed-superblock-hash-value may be done at the server or at the client. In stand-alone configurations, it would be performed at the solitary computer in question.

Figure 11:
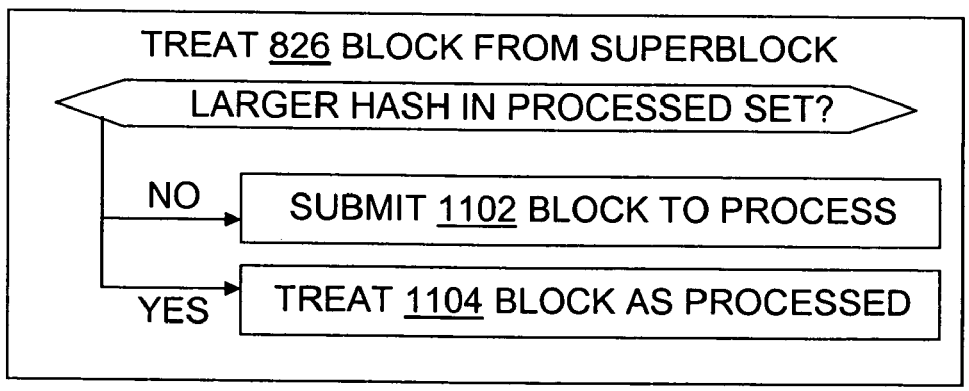
FIG. 11 is a flowchart further illustrating treatment of a block which has been designated part of a superblock.

For convenient illustration, and consistent with the fact that steps may be grouped, FIG. 8 shows a single box for a step 826. Step 826 includes treating 1104 data-blocks in the superblock as processed if the superblock-hash-value matches the processed-superblock-hash-value, and treating 1102 at least one data-block in the superblock as not yet processed if the superblock-hash-value does not match the processed-superblock-hash-value. Step 826 could thus also be viewed as multiple steps, as shown in FIG. 11, for example.

It will be understood that if the superblock hashes match, the probability of any block in the two superblocks having different content is so exceedingly small that it can be ignored in practice. The level of certainty provided by matching superblock hashes is believed to be an improvement over that provided by mere individual block hashes as in rsync, Venti, and so on.

On the other hand, if the superblock hashes differ, then the content of at least one block differs between the two superblocks. The difference is most likely due to data content differences in a single block, but it could be due to content differences in multiple blocks of the superblock. Thus, some embodiments stop checking after finding one differing block of the superblocks, while other embodiments check the content of every superblock block against the corresponding block of the other superblock. It will be understood that in embodiments attempting to use coordinated random blocks 1408, a difference in superblock hashes could also be due to a failure to coordinate the random content 1408 of the two superblocks whose hashes differ.

Figure 9:
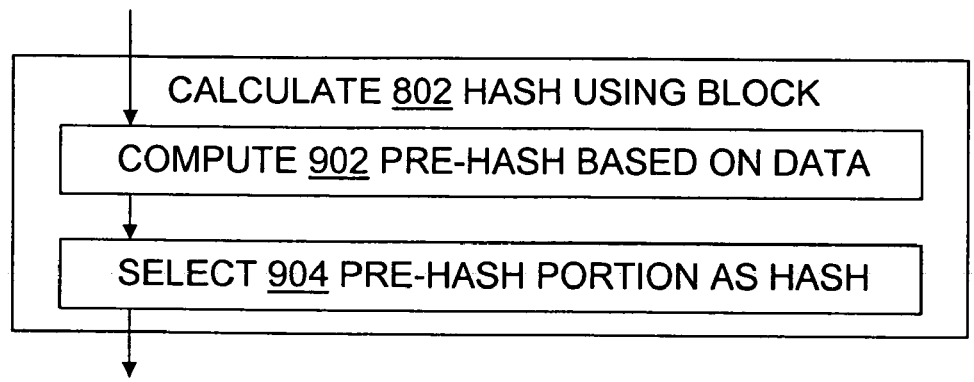
FIG. 9 is a flowchart further illustrating calculation of a hash value using selection of a portion of a larger value.

FIG. 9 illustrates a variation, in which the step 802 of calculating a data-block-hash-value includes calculating a hash value based on the data contents and then selecting only a portion of that hash value to be the data-block-hash-value. In this embodiment, calculation 802 of an individual block's hash value includes two steps. First, a pre-hash is computed 902 based on the block's data. This pre-hash may be considered a regular hash value in other contexts, and can be computed accordingly using a hash function. But in this context, a portion of the pre-hash is selected 904 and used as the block's hash value in subsequent steps, e.g., steps 804, 806, and 814. For instance, one might use only 120 bits of a 160-bit SHA-1 hash value, in order to reduce the network bandwidth used when communicating hash values.

Figure 10:
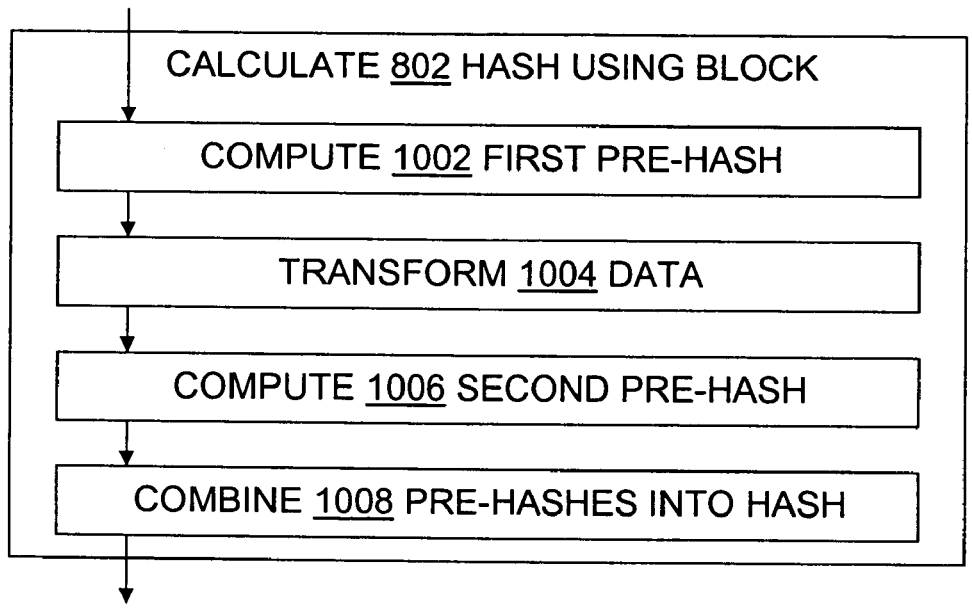
FIG. 10 is a flowchart further illustrating calculation of a hash value using data transformation and combination of hash values.

FIG. 10 illustrates another variation, in which calculation 802 of an individual block's hash value includes four steps. A first pre-hash is computed 1002, based on the block's data. The block's data is then transformed 1004 in some way. The transformation 1004 may be explicit, as when a copy of the block's data is bitwise XORed or ANDed with a mask, for instance. The transformation 1004 may also be implicit, as when a second pre-hash is computed 1006 by traversing a different part of the data and/or by traversing the block's data in a different order. For instance, the second pre-hash may be calculated using the same hash function as the first pre-hash but ignoring the first N bytes of the block's data, or treating the first N bytes as zeroed. As another example, the second pre-hash may be calculated by reading the block's data in reverse order from the calculation 1002 of the first pre-hash. Different hash functions may also be used for the two calculations 1002, 1006. The pre-hashes may each be considered a regular hash value in other contexts, and can be computed 1002, 1006 accordingly using a hash function.

Finally, the two pre-hashes are combined 1008 into a single value which then serves 804, 806, 814 as the block's hash value. Combination 1008 may be accomplished by abutting the two pre-hashes, or by interleaving their bits in some finer-grained manner (N bits from first pre-hash, M bits from second pre-hash, next N bits from first pre-hash, next M bits from second, etc.) Combination 1000 may also be accomplished by other means, such as by multiplying the two hash values.

More about Systems and Configured Media

Figure 12:
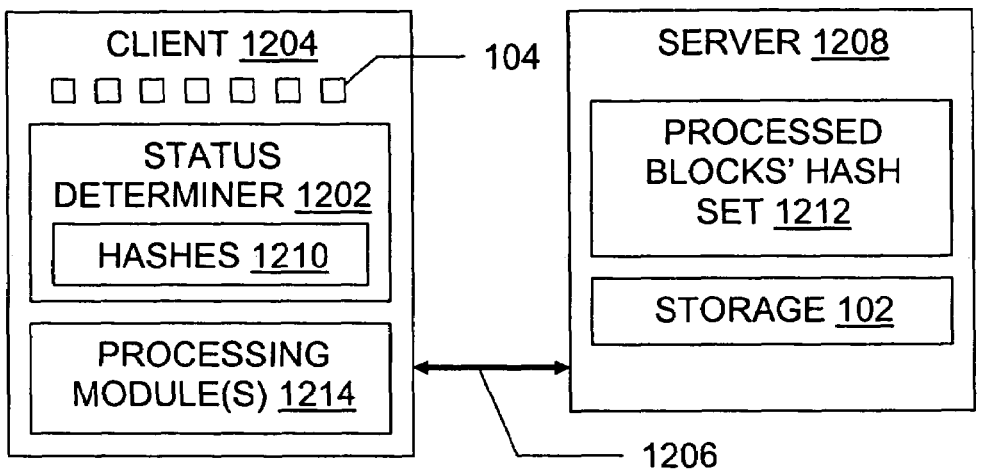
FIG. 12 is a diagram illustrating client-server configurations which may be used in some systems and methods that determine whether blocks have been processed.
Figure 14:
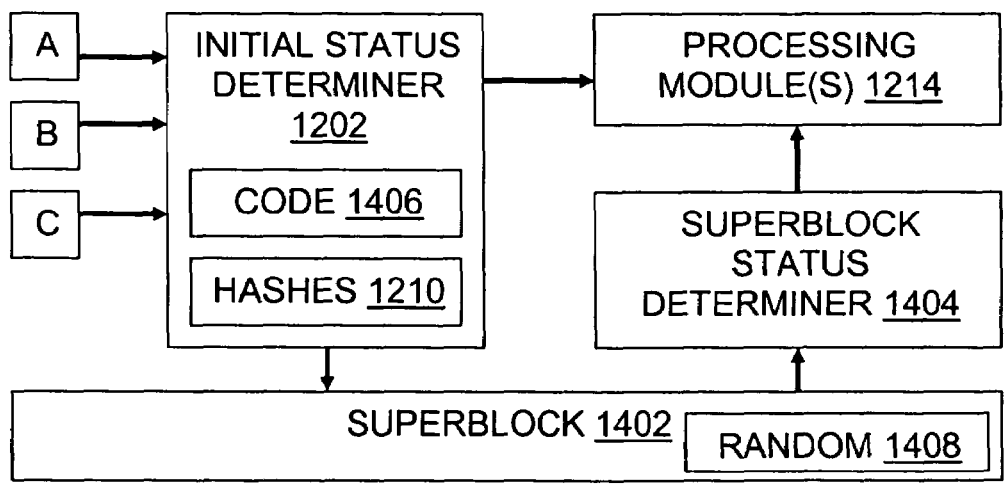
FIG. 14 is a diagram further illustrating some systems and methods that use at least one superblock in determining whether blocks have been processed.

As illustrated in FIGS. 12-14, for example, the present invention also provides systems. The systems of the invention are not limited to those shown in these particular figures. Different embodiments may omit, repeat, regroup, supplement, or rearrange the components illustrated, provided the system overall is operable and conforms to at least one claim. Any computer or set of computers configured with software and/or special-purpose hardware to operate according to a method of the invention, including without limitation methods discussed in connection with any of present FIGS. 8-11, is also a system according to the invention, if only because through such a system one uses a claimed method. In claims directed to systems having a means for determining the processing status of a block, for instance, suitable means include without limitation software which operates according to any of the methods shown in FIGS. 8-11.

It will be understood that a computer system such as client 1204 or server 1208 has at least one processor (a.k.a. CPU) and some associated memory, as a means for running software in the computer. A disk drive, flash memory, tape, and/or other storage 102 serves as a storage means for storing software and other data in a location accessible by the software-running means.

In particular and without eliminating other possibilities, the software (and its component code 12406, hashes 1210, 1212, modules 1214, and status determiners 1202, 1404) may reside on and configure a removable storage medium. Suitable media include one or more removable storage media such as memory keys, flash memory, CDs, DVDs, floppy disks, or other media removable from a computer and capable of carrying computer-readable data which persists even when power to the computer is turned off. Such media in their unformatted states and their generically formatted states are previously known. However, the invention permits the media to be specifically tailored to perform methods such as those illustrated by present FIGS. 8-11, by magnetic, optical, or other bit-storing configurations of data and instructions for performing such methods.

The components shown in the Figures may be combined in various ways, as recited in the claims. No particular file system format or programming language is required by the present invention, and a variety of operating systems and network protocols can likewise be used. Not every illustrated component need be present in every claimed embodiment. It will be appreciated that different embodiments may locate some or all of these components differently than a specific example given here.

It is understood that a single entity may sell, offer to sell, or use a system whose individual parts were made by more than one entity. That is, the mere fact that parts of a system were supplied by different vendors does not prevent use of that system (and hence direct infringement) by an individual entity.

It will be understood that the relative locations of components (e.g., hash tables, superblocks, code, storage) can make the system in question easier to use, faster, less space-consuming, more secure, or otherwise improve it. More generally, variations on the specific examples given herein will be apparent to those of skill in the art, bearing in mind considerations of operability, efficiency, security, ease, speed, maintainability, and other familiar criteria, in view of the descriptions provided in this document In general, the labels attached to items are not more important than the functionality involved. For instance, in some embodiments it may be more convenient to consider the superblock status determiner 1404 and the individual block initial status determiner 1202 as part of the same item, even though FIG. 14 shows them as distinct. Infringement is not avoided by pointing to some inconsistency between an accused embodiment and part of the invention description, when the claimed invention is clear to one of skill and otherwise covers the accused embodiment. It is not necessary for every means or aspect identified in a given definition or example to be present or to be utilized in every embodiment of the invention.

CONCLUSION

Methods are provided for safely reducing data processing, by detecting data already processed, by comparing data superblock hashes when individual data block hashes match. Systems and configured storage media for safely reducing data processing are also provided. Particular embodiments of the invention may significantly reduce the probability that an undetected hash collision will result in data loss in a UH/UHI SICS, for instance, and may further reduce the amount of network bandwidth required to implement a UH/UHI SICS. Similar benefits may be gained by other replication and remote-backup tools that use a hash to determine if data is already present at the remote location, and by other forms of processing outside the backup arena.

Some inventive methods are performed directly by computer hardware and software, and are used by people. They are performed on behalf of and in response to some person's controlling action. Regardless of whether one phrases the invention in terms of steps taken by a person to control a machine that performs a process, or in terms of using a corresponding process performed by a machine, those of skill will understand that it is the particular nature of the process itself that sets it apart as inventive.

Even though particular embodiments and uses of the present invention are expressly illustrated and described individually herein, it will be appreciated that discussion of one type of embodiment and its uses also generally extends to other embodiment types and their uses. For instance, the foregoing description of the invention's methods also helps describe the structures and operation of the invention's systems and configured storage media, and vice versa. It does not follow that limitations from one embodiment are necessarily read into another.

Headings are for convenience only; information on a given topic may sometimes be found outside the section whose heading indicates that topic. All claims as filed are part of the specification and thus help describe the invention, and repeated claim language may be inserted outside the claims as needed during prosecution.

Explanations given herein of the principles of the invention do not destroy the invention's usefulness if they are subsequently determined to be erroneous. Likewise, probability calculations and other discussions of specific aspects of the examples may be subject to correction without thereby undermining the invention's advantages and novelty.

It is to be understood that the above-referenced embodiments are merely illustrative of the application for the principles of the present invention. Numerous modifications and alternative embodiments can be devised without departing from the spirit and scope of the present invention. While the present invention has been shown in the drawings and described above in connection with the exemplary embodiments of the invention, it will be apparent to those of ordinary skill in the art that numerous modifications can be made without departing from the principles and concepts of the invention as set forth in the claims.

As used herein, terms such as "a" and "the" and designations such as "hash" and "calculating" are inclusive of one or more of the indicated thing or step. In particular, in the claims a reference to a thing generally means at least one such thing is present and a reference to a step means at least one instance of the step is performed. Some terms in the claims are hyphenated for convenience, but it will be understood that the terms may also be written without hyphens. For instance, the terms "hash value" and "hash-value" are interchangeable.

The scope of the invention is indicated by the appended claims rather than by the foregoing description. All changes which come within the meaning and range of equivalency of the claims are to be embraced within their scope to the full extent permitted by law.

What is claimed is:

1. A computer-implemented method of reducing data processing, comprising:
    obtaining a data-block containing data contents;
    calculating a data-block-hash-value based at least in part on the data contents;
    determining whether the data-block-hash-value appears in a set of processed-block-hash-values of data-blocks;
    if the data-block-hash-value is not in the set of processed-block-hash-values, submitting the data-block for processing;
    if the data-block-hash-value is in the set of processed-block-hash-values, adding the data-block to a superblock of data-blocks;
    calculating a superblock-hash-value based at least in part on the data contents of data-blocks in the superblock;
    comparing the superblock-hash-value to a processed-superblock-hash-value; and
    treating data-blocks in the superblock as processed if the superblock-hash-value matches the processed-superblock-hash-value, and treating at least one data-block in the superblock as not yet processed if the superblock-hash-value does not match the processed-superblock-hash-value.

2. The method of claim 1, further comprising adding the data-block-hash-value to the set of processed-block-hash-values if the data-block-hash-value is not already in the set.

3. The method of claim 1, further comprising adding to a processed-superblock a processed-data-block that has the same hash as a data-block whose data-block-hash-value is in the set of processed-block-hash values.

4. The method of claim 1, further comprising communicating at least one of the processed-superblock-hash-value and the superblock-hash-value over a computer network connection before comparing the superblock-hash-value to the processed-superblock-hash-value.

5. The method of claim 1, wherein calculating a superblock-hash-value occurs only after a predetermined number of data-blocks are added to the superblock.

6. The method of claim 1, wherein calculating a superblock-hash-value occurs after a data-block which contains generated random content is added to the superblock.

7. The method of claim 1, wherein the superblock-hash-value has a different number of bits than the data-block-hash-value.

8. The method of claim 1, wherein the superblock-hash-value is computed using a different hash algorithm than is used for computing data-block-hash-values.

9. The method of claim 1, further comprising using, for each obtained data-block in the superblock, a data-block-larger-hash-value which has more bits than the data-block's data-block-hash-value, and wherein treating at least one data-block in the superblock as not yet processed if the superblock hash-value does not match the processed-superblock-hash-value comprises:
    determining whether the data-block-larger-hash-value appears in a set of processed-block-larger-hash-values of data-blocks;
    if the data-block-larger-hash-value is not in the set of processed-block-larger-hash-values, submitting the data-block for processing; and
    if the data-block-larger-hash-value is in the set of processed-block-hash-values, treating the data-block as processed.

10. The method of claim 1, wherein calculating a data-block-hash-value comprises calculating a hash value based on the data contents and selecting only a portion of that hash value to be the data-block-hash-value.

11. The method of claim 1, wherein calculating a data-block-hash-value comprises:
    calculating a first pre-hash value based on the data contents;
    transforming a copy of the data contents;
    calculating a second pre-hash value based on the transformed data contents; and
    combining the first pre-hash value and the second pre-hash value to form at least a portion of the data-block-hash-value.

12. The method of claim 1, further comprising processing a data-block after the data-block is submitted for processing.

13. The method of claim 12, wherein processing a data-block comprises transferring the data-block contents across a network link to a remote server computer as part of a data backup procedure.

14. At least one computer-readable storage medium configured to cause a computer system with at least one computer to perform a method comprising:
    obtaining a data-block-hash-value based on content of a data block;
    determining whether the data-block-hash-value appears in a set of processed-block-hash-values of data-blocks;
    if the data-block-hash-value is in the set of processed-block-hash-values, adding the data-block to a superblock of data-blocks;
    obtaining a superblock-hash-value based on the contents of data-blocks in the superblock;

obtaining a processed-superblock-hash-value based on the contents of data-blocks in another superblock;

comparing the superblock-hash-value to the processed-superblock-hash-value; and treating at least one data-block in the superblock as not yet processed if the superblock-hash-value does not match the processed-superblock-hash-value.

15. The configured medium of claim 14, wherein the superblock-hash-value is also based on a random value, and the method further comprises adding the random value to the superblock.

16. A computer system comprising:

a processor-memory means for running software in a computer, the processor configured to:

obtain a data-block containing data contents;

calculate a data-block-hash-value based at least in part on the data contents;

determine whether the data-block-hash-value appears in a set of processed-block-hash-values of data-blocks;

if the data-block-hash-value is not in the set of processed-block-hash-values, submit the data-block for processing;

if the data-block-hash-value is in the set of processed-block-hash-values, add the data-block to a superblock of data-blocks;

calculate a superblock-hash-value based at least in part on the data contents of data-blocks in the superblock;

compare the superblock-hash-value to a processed-superblock-hash-value; and treat data-blocks in the superblock as processed if the superblock-hash-value matches the processed-superblock-hash-value, and treating at least one data-block in the superblock as not yet processed if the superblock-hash-value does not match the processed-superblock-hash-value.

17. The computer system of claim 16, wherein the processor is further configured to calculate a superblock hash value.

18. The computer system of claim 16, wherein the processor is further configured to compare hash values of individual blocks and also compare hash values of superblocks.

19. The computer system of claim 16, wherein the processor is further configured to compare a superblock hash value of blocks whose processing status is unknown with a superblock hash value of blocks that have been processed by being placed in a cluster store.

20. The computer system of claim 16, wherein the processor is further configured to compare a superblock hash value communicated to the machine over a network with a superblock hash value calculated on the machine.

21. A system comprising:

a server computer;

at least one client computer connected to the server computer by a network;

data blocks for processing;

a set of hashes of blocks which are known to have been processed;

a set of hashes of blocks whose processing status has not yet been determined;

two superblocks, one containing at least one block whose processing status has not yet been determined and the other containing blocks whose hashes match those in the first superblock, but all of which have been processed or are already scheduled for processing; and software for calculating superblock hashes and comparing them, whereby the system treats data blocks in the superblocks as processed if the superblock hashes match, and the system treats at least one data block in a superblock as not yet processed if the superblock hashes do not match.

22. The system of claim 21, wherein the system comprises a single instance cluster store, and the system processes data blocks by placing them in the cluster store and updating the set of hashes of blocks which are known to have been processed to reflect that placement.

23. The system of claim 21, wherein the system comprises a Unique Hash with Index cluster store.

24. The system of claim 21, wherein the system comprises at least one of the following:

software for processing data blocks by performing statistical analysis of data block contents;

software for processing data blocks by performing image processing on data block contents;

software for processing data blocks by translating data block contents;

software for processing data blocks by performing numerical processing on data block contents;

software for processing data blocks by performing compression-related processing on data block contents;

software for processing data blocks by performing encryption-related processing on data block contents.

* * * * *